United States Patent [19]
Schluckebier

[11] 4,122,866
[45] Oct. 31, 1978

[54] CONTROL VALVE FOR POWER CYLINDER OF STEERING GEAR

[75] Inventor: Floyd A. Schluckebier, Vassar, Mich.

[73] Assignee: General Motors Corporation, Detroit, Mich.

[21] Appl. No.: 785,597

[22] Filed: Apr. 7, 1977

[51] Int. Cl.² .................................................. F15B 9/1
[52] U.S. Cl. .............................. 137/625.27; 91/375 A; 251/229
[58] Field of Search ................ 137/625.27; 91/375 A; 251/229

[56] References Cited
U.S. PATENT DOCUMENTS
3,733,967  5/1973  Duffy ................................. 91/375 A

*Primary Examiner*—Alan Cohan
*Attorney, Agent, or Firm*—Charles R. White

[57] ABSTRACT

Hydraulic control valve with compact radial and axial dimensions for power steering gear in which a hydraulically balanced and centralized valve element is linearly shifted by internal crank elements in response to rotation of an input shaft for controlling actuation of a power cylinder to effect powered left and right steering turns. A valve and seal ring is interposed between two face seals carried by the valve element so that operating fluid is selectively supplied to and exhausted from left and right turn steering lines.

4 Claims, 4 Drawing Figures

CONTROL VALVE FOR POWER CYLINDER OF STEERING GEAR

This invention relates to hydraulic controls for power steering gears and more particularly to a new and improved hydraulic valve for controlling the supply and exhaust of pressure fluid with respect to a power cylinder and featuring a linearly shiftable valve element actuated by an internal drive mechanism interconnecting a rotary input shaft with the valve element.

Prior to the present invention, a number of steering wheel actuated control valves for power steering gears have incorporated axially shiftable valve elements operated through camming devices or external linkages which interconnect the manual steering wheel with the valve element. In other power steering gears rotary sleeve valves have been utilized which are connected to a rotary stub shaft for controlling the supply and exhaust of fluid pressure from the power steering gear unit. While these prior devices have been successfully utilized to accomplish efficient power steering they are often costly, complex and bulky and many are not well suited for a wide range of power steering gears and particularly for rack and pinion gear units.

In this invention, there is a new and improved open-center hydraulic valve having compact radial and axial dimensions as compared to many prior valves. This valve features a linearly shiftable valve element hydraulically balanced and actuated by internal lever means for improved operation of a wide variety of power steering gears including rack and pinion type gears. The valve element is hydraulically balanced and is mechanically centered by a torsion bar when steering effort ceases.

It is a feature, object and advantage of this invention to provide a new and improved linearly shiftable hydraulic valve element and internal lever means responsive to selective rotation of an input shaft to control the actuation of a hydraulically operated device such as the two-way cylinder of a power steering gear.

Another feature, object and advantage of this invention is to provide an open-center hydraulic valve having a hydraulically balanced, linearly-shiftable valve element to control the supply and exhaust of pressure fluid to a two-way cylinder and featuring bellcrank mechanisms internal of the valve and interconnecting a rotary input with the linearly shiftable valve element and in which the valve element is returned to a neutralized central position by a torsion spring device extending linearly through the input shaft and valve element.

Another feature, object and advantage of this invention is to provide a new and improved hydraulic valve for a rack and pinion power steering gear and featuring a linearly shiftable cylindrical valve element actuated by a rotary stub shaft interconnected with the valve element by a pair of internal actuator levers mounted on the stub shaft and turned in response to rotation of an input to effect the linear shifting of the valve element so that pressure fluid can be fed to and exhausted from selected chambers of a two-way cylinder of a steering gear for power assist steering.

These and other features, objects and advantages of this invention will be more apparent from the following detailed description and drawings in which.

Figure 1:
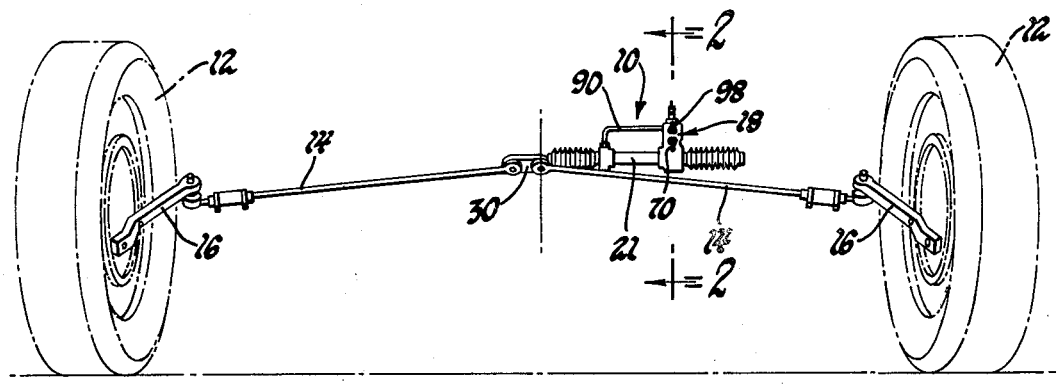
FIG. 1 is a perspective view of a steering gear assembly, tie rods and dirigible wheels of a vehicle.

Turning now in greater detail to the drawing, there is shown in FIG. 1 a rack and pinion power steering gear assembly 10 operatively connected to a pair of dirigible wheels 12 of a vehicle by tie rods 14 and steering arms 16. The steering gear assembly 10 has a hydraulic control valve unit 18 that is actuated by stub shaft 20 adapted to be turned in clockwise and counterclockwise directions by a manually operated steering wheel (not shown) which is conventionally drivingly connected to the stub shaft. The valve unit 18 controls the supply and exhaust of fluid from the two-way power cylinder 21 which preferably is similar to that described in U.S. Pat. No. 3,951,045 to Frei et al issued Apr. 20, 1976 hereby incorporated by reference. This valve unit has a pinion gear 22 integral with rotatable cylindrical output shaft 24. The pinion gear is meshingly engaged with teeth 26 of a rack 28 that extends laterally in power cylinder 21. Clockwise or counterclockwise rotation of the pinion 24 by stub shaft 20 will cause corresponding lateral movement of the rack to the left or right to effect mechanical steering of a vehicle. The inboard end of rack 28 is drivingly connected to a tie rod connector 30 which has side-by-side openings which receive pivot connections for the inner ends of the left and right tie rods.

The rack 28 and its connection with a laterally movable power piston in the power cylinder 21 are described in referenced U.S. Pat. No. 3,951,045 so that a detailed description of such power assist components and their operation are not repeated in this description. It will be appreciated however that pressure fluid selectively fed to and exhausted from opposing pressure chambers formed by the piston in the power cylinder will result in the power assisted movement of the rack to substantially reduce the steering effort required of the vehicle operator.

The valve unit 18 of this invention for controlling power piston operation comprises a housing with upper and lower parts 36 and 38 secured together by suitable threaded fasteners (not shown). The stub shaft 20 extends into an axial bore 40 formed in the housing and is mounted for rotation therein by annular bearing 42 seated on shouldered portions of the internal diameter of bore 40 and the outer diameter of the stub shaft. This bearing is retained in place by a snap ring seated in an annular groove in the housing and by an annular retainer 46 seated on the stub shaft. Elastomer seals 47 are interposed between the stub shaft 20 and the entrance of the axial bore 40. As shown the axial bore 40 is radially enlarged in the central portion of the housing to form a chamber 50 to receive a cylindrical and linearly shiftable valve element 52 that controls the supply and exhaust of pressure fluid with respect to the power cylinder.

A pair of axially spaced, annular face seals 54 and 56 secured to the valve element 52 extend radially outwardly therefrom into chamber 50. Cooperating with these face seals is an annular valve ring 58 that extends radially inwardly from the valve housing into chamber 50 between the annular face seals 54 and 56. The valve ring has a central axial opening through which the valve element 52 extends and has flat side surfaces 60 and 62 which are adapted to be selectively sealingly engaged by the face seals 54 and 56 in response to the axial shifting of the valve element in opposite directions. The face seals 54 and 56 are further adapted to selectively sealingly engage the annular walls 64 and 66 which form the upper and lower end walls of chamber 50 in response to axial shifting of the valve element in opposite directions to control fluid flow to and from the power cylinder 21.

An inlet conduit 70 leading from a conventional engine-driven, power steering pump (not shown) is connected to the lower part of the valve housing 38 by threaded fitting 72. U.S. Pat. No. 3,022,772 to Zeigler et al issued Feb. 27, 1962 hereby incorporated by reference discloses a suitable hydraulic pump and reservoir usable with this invention. A passage 74 in this portion of the housing feeds pressure fluids to an annular groove 76 formed in the valve ring and radial passages 78 extending inwardly from the annular groove 76 feed pressure fluid into the chamber 50. In addition to the feed passage 74, the lower portion of the valve housing has a right turn outlet passage 80 which leads into the conduit 82 connected to the valve housing 38 by a threaded fitting 84. Conduit 82 feeds pressure fluid to one side of the power piston slidably mounted in the power cylinder for the powered right turn of the vehicle. On left turn operation fluid is exhausted through this line from the power piston.

A left turn passage 88 formed in the upper portion of the valve housing, leads from the upper end chamber 50 to a left turn conduit 90 connected into the upper portion of the valve housing by a threaded fitting 92. In addition to the left turn passage 88, the upper portion of the housing has an outlet passage 96 leading from a stepped intermediate chamber 100 formed in the upper portion of the housing between the stub shaft bore 40 and fluid chamber 50. A return conduit 98 connected to passage 96 by a threaded fitting 101 conducts fluid from the intermediate chamber 100 to the sump of the power steering pump (not shown).

When the valve element 52 is fully shifted upwardly, the upper face seal 54 sealingly engages the upper annular wall 64 of chamber 50 while the lower face seal 56 sealingly engages the lower surface 62 of the valve ring 58. Under such conditions, the left turn conduit 90 is hydraulically connected to pump pressure through conduit 70, the radial passages 78 in the valve ring and the chamber formed by the two face seals. The right turn conduit 82 at this time is hydraulically connected to the return or exhaust conduit 98 by the central axial passage in the shiftable valve element 52, intermediate chamber 100 and exhaust passage 96. Under such conditions, the left turn chamber of the power cylinder will be pressurized as the right turn chamber is exhausted for left turn steering. The amount of powered turn depends on the amount of turn the vehicle operator puts into the vehicle steering wheel so that when input steering effort ceases, the power assisted turning will cease.

In a manner similar to powered left turn steering, powered right turn steering can be accomplished with this invention. However, the valve element 52 is shifted downwardly so that ring seal 56 engages the lower end wall 66 of chamber 50 as seal ring 54 engages the upper surface 60 of valve ring 58. Under such conditions, the right turn conduit 82 is hydraulically connected to the pressure input conduit 70 as the left turn conduit 90 is open to exhaust conduit 98 for the powered right turn steering.

Axial shifting of the valve element 52 selectively upwardly or downwardly is accomplished through corresponding clockwise or counterclockwise turning of the stub shaft 20 through the vehicle steering wheel. To this end, a pair of cranks 108 and 110 diametrically opposed to one another are pivoted to the stub shaft 20 by pivots 112 and 114. The cranks 108 and 110 are substantially the same in construction and operation so that only crank 108 is described in detail. As shown, crank 108 has a first arm 116 that extends circumferentially along the periphery of the stub shaft 20 and terminates in an enlarged head portion 120 that seats in an annular internal groove 112 formed in valve element 52. In addition to the first arm, the crank 108 has a second arm 123 disposed at right angles with respect to the first arm that extends axially along the stub shaft and terminates in an enlarged split head portion 124 that slidably fits into an axial slot 126 formed in an upper cylindrical extension 128 of the output shaft 24. In addition to the axial slots 126, the extension 128 has an inner cubical socket 130 that mates with the corresponding cubical drive 132 of the stub shaft. There is, however, sufficient clearance or lash between these mating polygonal parts which permits from 5° to 7° relative turning motion therebetween. With such relative motion, the stub shaft 20 initially is turned a limited amount in either direction relative to the output shaft and pinion 22 to cause the cranks to pivot on their respective pivot pins. The cranks are pivoted because the enlarged head portions 124 of the crank arms are restrained by the walls of the slots 126 in the output shaft. If the stub shaft is turned in a clockwise direction, the cranks 108 and 110 pivot to shift the valve element downwardly in chamber 50 for powered right turn steering. Left turn steering will be accomplished in a manner opposite to that described in connection with right turn steering.

Figures 2, 3, 4:
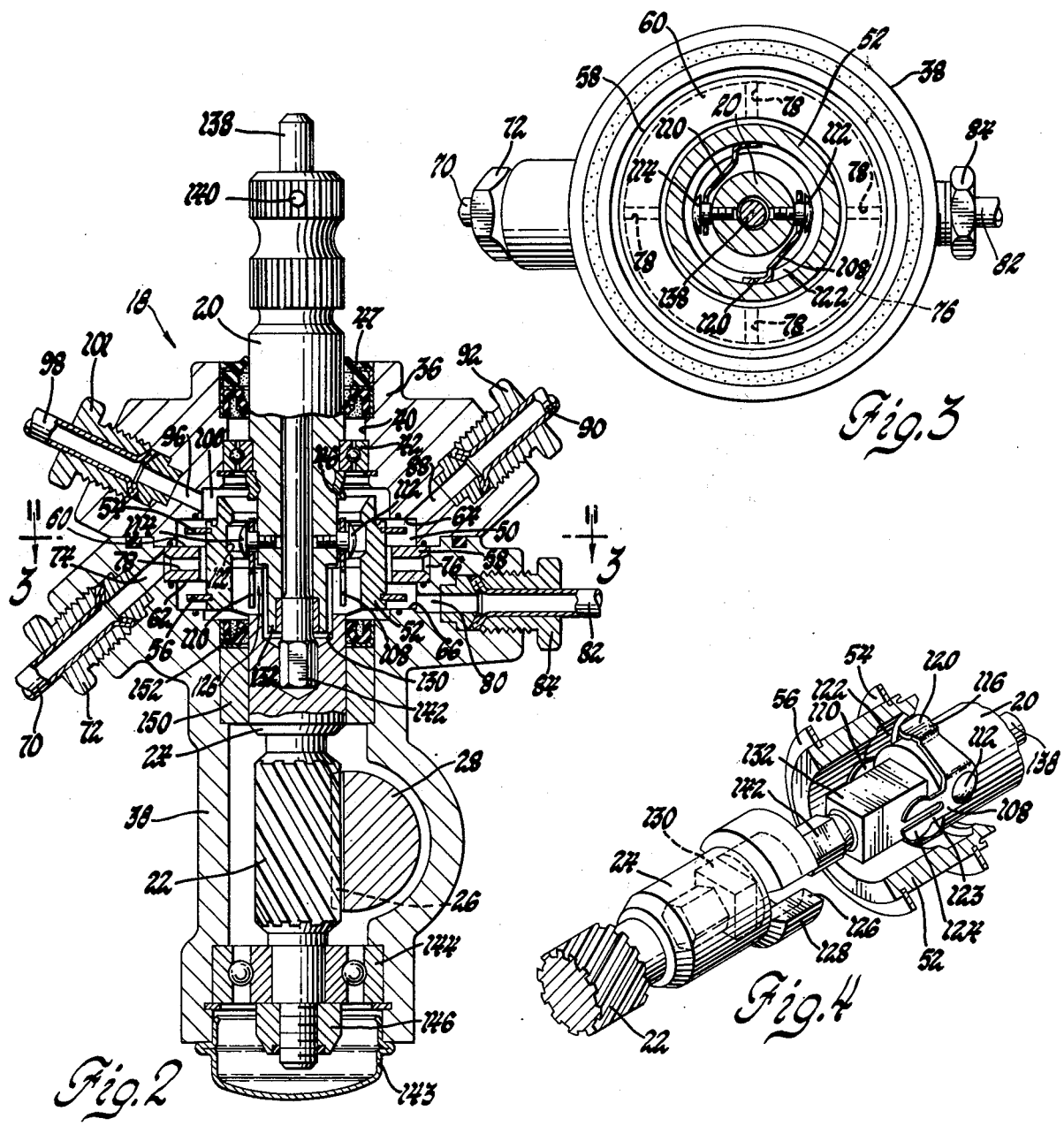
FIG. 2 is a sectional view of the valve assembly of the steering gear assembly of FIG. 1 taken generally along line 2—2 thereof.
FIG. 3 is a cross sectional view taken generally along line 3—3 of FIG. 2.
FIG. 4 is an exploded perspective view with parts broken away of a portion of the valve assembly an pinion drive of the steering gear assembly of this invention.

A torsion bar 138 extends linearly through the stub shaft 20 and has its outer end secured by pin 140 to the outer end of this component. The inner end of the torsion bar is drivingly connected by a closely mating polygonal connection 142 to the inner end of the output shaft 24. The torsion bar 138 is wound on manual turning of the stub shaft because of the lost motion connection between the stub shaft and output shaft 24 and provides for steering feel and for a spring force to effect the axial centering of the valve element to the FIG. 2 position when the turning effort imparted to the stub shaft is completed.

A cup-like end cap 142 is fitted into an end opening of the lower valve housing to seal the housing and protect the lower annular bearing 144 which rotatably supports the output shaft 24. Nut 146, threaded onto the end of the output shaft, secures the bearing 144 in its seated position in the lower housing. As shown the upper portion of the rotatable output shaft 24 is mounted in the housing by bearing 150. An annular elastomer seal 152 seated on the upper surface of bearing 150 and between the bore 40 and the outer periphery of output shaft 24 prevents leakage of fluid from chamber 50.

From the above, it will be understood and appreciated that this invention provides for a new and improved power steering gear valve which has a small radial and axial size and a fewer number of parts. The valve element is completely hydraulically balanced and a torsion bar spring centers the linearly movable spool in a neutral position whereby the valve element can be moved in a selected linear direction by improved mechanical interconnection between the input shaft and the valve element for powered left and right turn steering.

While a preferred embodiment of this invention has been shown and described to illustrate the invention, other embodiments and modifications will now be apparent to those skilled in the art. Accordingly, this invention is not limited by the description of the preferred embodiment, but only by the following claims

I claim:

1. A hydraulic control valve for a power steering unit comprising a valve housing, a manual input shaft mounted for limited rotary movement in said valve housing, a linearly movable valve element disposed around said input shaft mounted in said housing, said housing having an input passage for supplying pressure fluid to said valve element, an exhaust passage for exhausting fluid from said valve element and a pair of additional passages for right and left turn power steering, lever means supported within said housing and on said valve element for mechanically interconnecting said input shaft to said valve element for shifting said valve element in a first linear direction in response to the turning of said input in a first rotary direction to thereby operatively connect the input passage to a first of said additional passages and to further connect the second of said additional passage to said exhaust passage for powered right turn steering, said lever means being acutated to shift said valve element in an opposite linear direction in response to the turning of said input shaft in a second rotary direction to hydraulically connect said input passage to the second of said additional passages and to connect the first of said additional passages to said exhaust passage for powered left turn steering and spring means operatively connecting said input shaft to said valve element to center said valve element in a position whereby an input pressure fed to said input passage is operatively connected to said exhaust passage when turning effort exerted on said input shaft is terminated.

2. A hydraulic control valve for a vehicle power steering unit comprising a valve housing, a manual input shaft mounted for limited rotary movement in said valve housing, a valve element mounted for linear movement in said housing, said housing having an input passage for supplying pressure fluid to said valve element, an exhaust passage for exhausting fluid from said valve element and a pair of additional passages for right and left turn power steering, lever means pivotally supported on said valve element within said housing for mechanically interconnecting said rotary input to said valve element to shift said valve element in a first linear direction in response to the turning of said input shaft in a first rotary direction to thereby operatively connect the input passage to a first of said additional passages and to further connect the second of said additional passages to said exhaust passage for powered right turn steering, said lever means being actuated to shift said valve element in an opposite linear direction in response to the turning of said input shaft in a second rotary direction to hydraulically connect the input passage to the second of said additional passages and to connect the first of said additional passages to said exhaust passage for powered left turn steering and torsion bar means operatively connecting said input shaft to said valve element to center said valve element in a position whereby an input pressure fed to said input passage is operatively connected to said exhaust passage when turning effort exerted on said input shaft is terminated.

3. A hydraulic control valve for vehicle power steering unit comprising a valve housing, a manual input shaft mounted for limited rotary movement in said valve housing and rotated by application of a turning effort thereto, a valve element coaxial with respect to said input shaft mounted for linear movement in said housing, said housing having an input passage for supplying pressure fluid to said valve element, an exhaust passage for exhausting fluid from said valve element and a pair of additional passages for right and left turn power steering, crank means pivotally supported within said housing on said valve element for mechanically interconnecting said rotary input shaft to said valve element to shift said valve element in a first linear direction in response to the turning of said input shaft in a first rotary direction to thereby operatively connect said input passage to a first of said additional passages and to further connect the second of said additional passages to said exhaust passage for powered right turn steering, said crank means being actuated to shift said valve element in an opposite linear direction in response to the turning of said input shaft in a second rotary direction to hydraulically connect the input passage to the second of said additional passages and to connect the first of said additional passages to said exhaust passage for powered left turn steering, and torsion bar means coaxial with said input shaft and said valve element operatively connecting said input shaft to said valve element to center said valve element in a position whereby an input pressure fed to said input passage is operatively connected to said exhaust passage in response to removal of turning effort from said input shaft.

4. A hydraulic control valve for a vehicle power steering unit comprising a valve housing, a manual input shaft mounted for limited rotary movement in said valve housing and rotated by the application of a turning force thereto, an output shaft axially aligned with said input shaft terminating in a pinion gear, a rack driven by said pinion gear, lost motion drive means drivingly interconnecting adjacent ends of said input shaft and said output shaft, a cylindrical valve element mounted for linear movement in said housing, said valve element having an axial passage therethrough receiving said input shaft, said housing having an input passage for supplying pressure fluid to said valve element, an exhaust passage for exhausting fluid from said valve element and a pair of additional passages for right and left turn power steering, crank means for actuating said valve element, said crank having first arm means connected with said output shaft and second arm means connected with said valve element, said crank being pivotally mounted on said input shaft and mechanically interconnecting said rotary input to said valve element to shift said valve element in a first linear direction in response to the turning of said input shaft in a first rotary direction to thereby operatively connect the input passage to a first of said additional passages and to further connect the second of said additional passages to said exhaust passage for powered right turn steering, said crank means being actuated to shift said valve element in an opposite linear direction in response to the turning of said input shaft in a second rotary direction to hydraulically connect the input passage to the second of said additional passages and to connect the first of said additional passages to said exhaust passage for powered left turn steering, and torsion bar means extending linearly through said input shaft operatively connecting said input shaft to said valve element to center said valve element in a position whereby an input pressure fed to said input passage is operatively connected to said exhaust passage in response to removal of turning effort exerted on said input shaft.

* * * * *